United States Patent
Conger et al.

(10) Patent No.: US 10,272,857 B2
(45) Date of Patent: Apr. 30, 2019

(54) VEHICLE CAMERA ASSEMBLY

(71) Applicant: MAGNA ELECTRONICS INC., Auburn Hills, MI (US)

(72) Inventors: Jonathan D. Conger, Berkley, MI (US); Steven V. Byrne, Goodrich, MI (US); Brian D. Brasier, Howell, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 164 days.

(21) Appl. No.: 15/238,004

(22) Filed: Aug. 16, 2016

(65) Prior Publication Data

US 2017/0054881 A1 Feb. 23, 2017

Related U.S. Application Data

(60) Provisional application No. 62/205,912, filed on Aug. 17, 2015.

(51) Int. Cl.
| | |
|---|---|
| *H04N 5/00* | (2011.01) |
| *B60R 16/03* | (2006.01) |
| *H04N 5/225* | (2006.01) |
| *B60R 11/04* | (2006.01) |
| *B60R 11/00* | (2006.01) |

(52) U.S. Cl.
CPC .............. *B60R 16/03* (2013.01); *B60R 11/04* (2013.01); *H04N 5/2253* (2013.01); *H04N 5/2254* (2013.01); *H04N 5/2257* (2013.01); *B60R 2011/004* (2013.01)

(58) Field of Classification Search
CPC .... H04N 5/2254; H04N 5/2253; C09J 163/00

USPC ......................................................... 348/148
See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 7,965,336 | B2 | 6/2011 | Bingle et al. |
| 8,503,061 | B2 | 8/2013 | Uken et al. |
| 8,542,451 | B2 | 9/2013 | Lu et al. |
| 8,866,907 | B2 | 10/2014 | McElroy et al. |
| 9,233,641 | B2 | 1/2016 | Sesti et al. |
| 9,277,104 | B2 | 3/2016 | Sesti et al. |
| 9,609,757 | B2 | 3/2017 | Steigerwald |
| 2011/0310248 | A1 | 12/2011 | McElroy et al. |

(Continued)

*Primary Examiner* — Jeffery A Williams
(74) *Attorney, Agent, or Firm* — Honigman LLP

(57) ABSTRACT

A method for assembling a camera for a vision system of a vehicle includes providing a circuit element having an imager disposed thereat, with the imager including a pixelated imaging array having a plurality of photosensing elements. A lens holder is provided that includes a lens, and a camera housing element is provided. The camera housing element includes an electrical connector having a plurality of electrically conductive pins. The lens is aligned and focused relative to the imager and the circuit element is affixed relative to the lens holder when the lens is aligned and focused relative to the imager. A header connector is positioned and attached at the circuit element after the circuit element is affixed relative to the lens holder. The camera housing element is mated with the lens holder, including electrically connecting the electrically conductive pins to respective electrically conductive elements of the header connector.

20 Claims, 7 Drawing Sheets

(56) References Cited

U.S. PATENT DOCUMENTS

| | | | |
|---|---|---|---|
| 2013/0222595 A1 | 8/2013 | Gebauer et al. | |
| 2013/0242099 A1* | 9/2013 | Sauer | H04N 5/2257 348/148 |
| 2013/0328672 A1 | 12/2013 | Sesti et al. | |
| 2013/0344736 A1 | 12/2013 | Latunski | |
| 2014/0138140 A1 | 5/2014 | Sigle | |
| 2014/0320636 A1 | 10/2014 | Bally et al. | |
| 2014/0362209 A1 | 12/2014 | Ziegenspeck et al. | |
| 2014/0373345 A1 | 12/2014 | Steigerwald | |
| 2015/0222795 A1 | 8/2015 | Sauer et al. | |
| 2015/0266430 A1 | 9/2015 | Mleczko et al. | |
| 2015/0365569 A1 | 12/2015 | Mai et al. | |
| 2016/0037028 A1 | 2/2016 | Biemer | |
| 2016/0268716 A1 | 9/2016 | Conger et al. | |
| 2017/0101611 A1 | 4/2017 | Friederich et al. | |
| 2017/0129419 A1 | 5/2017 | Conger et al. | |
| 2017/0133811 A1 | 5/2017 | Conger et al. | |
| 2017/0295306 A1 | 10/2017 | Mleczko | |
| 2017/0302829 A1 | 10/2017 | Mleczko et al. | |

* cited by examiner

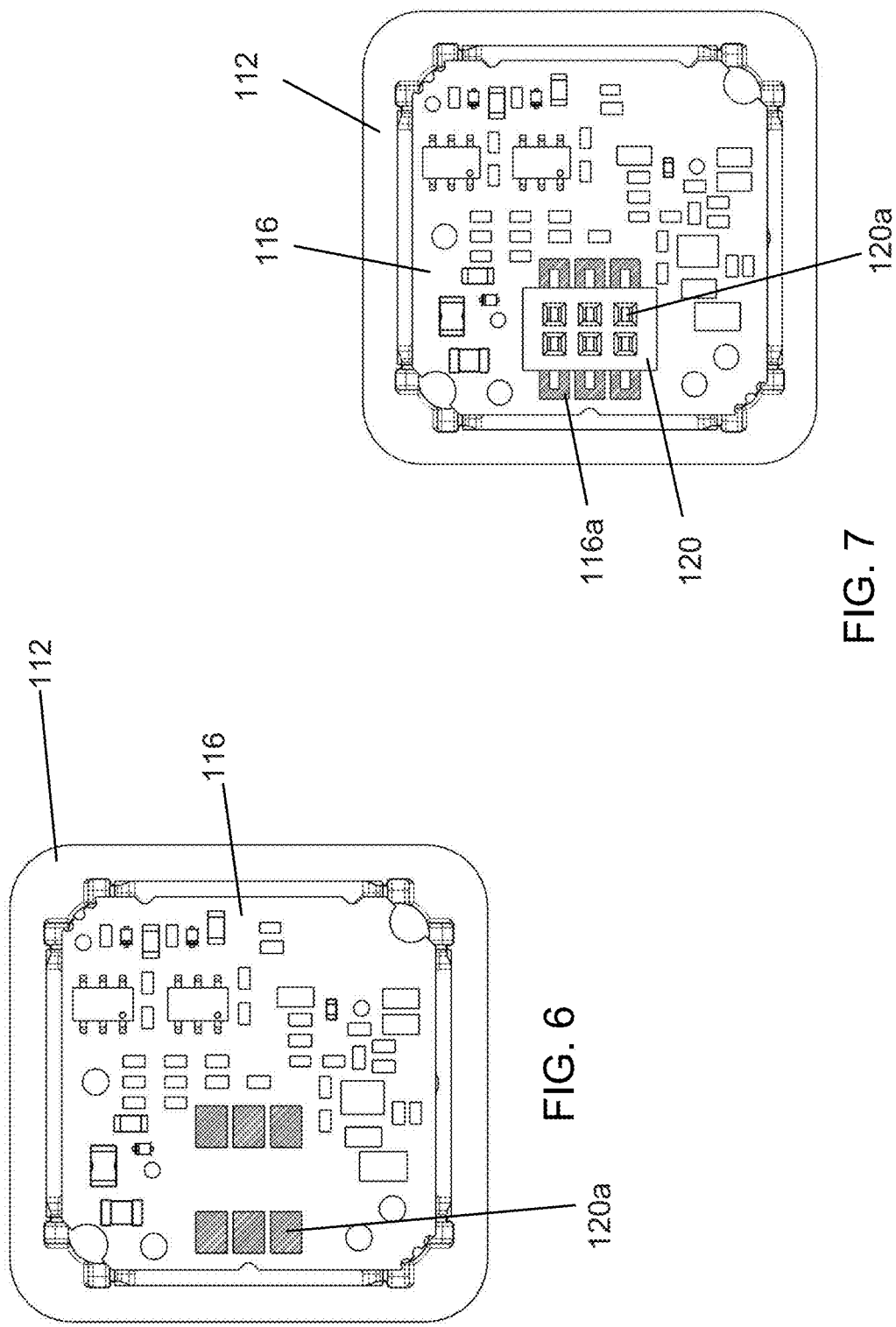

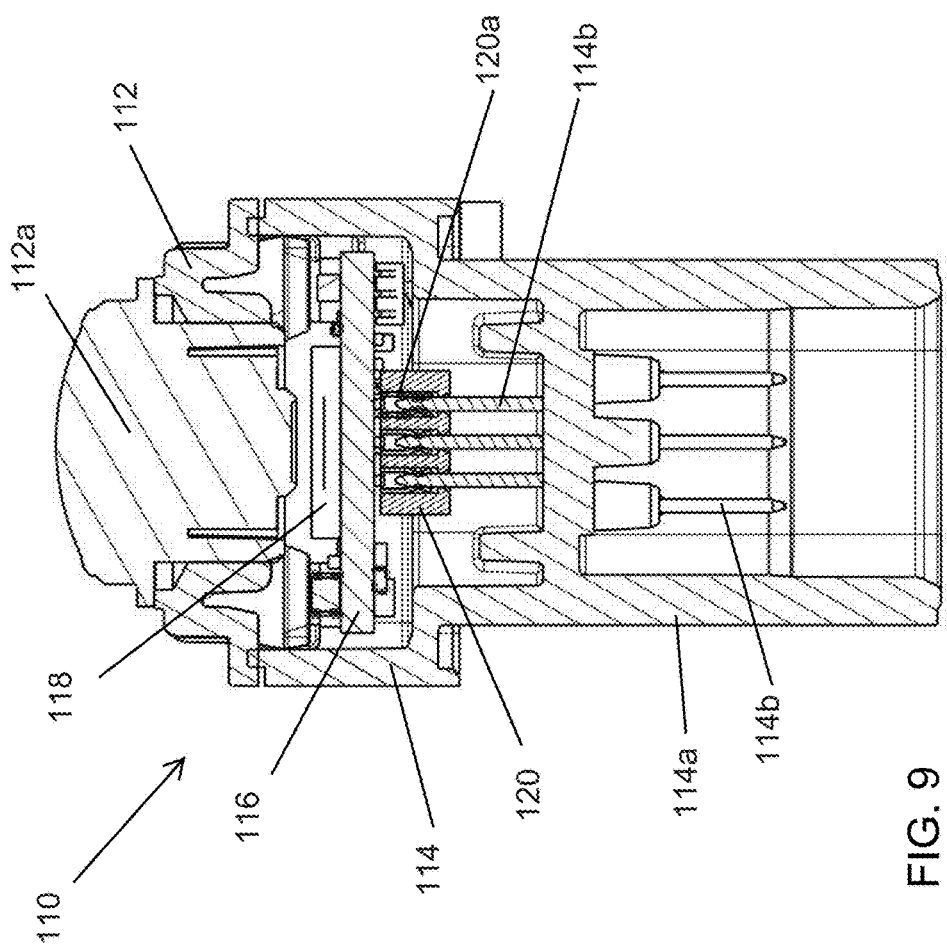

| Known Process | Process of the Present Invention |
|---|---|
| 1. Build PCB through SMT process | 1. Build PCB through SMT process without header |
| 2. Focus and align PCB to lens | 2. Focus and align PCB to lens |
| 3. Connect PCB header to housing utilizing a compliant member and weld | 3. Apply header to a known position on the PCB using the lens mechanical datums or the optical axis of camera |
| | 4. Connect PCB header to housing and weld |

VEHICLE CAMERA ASSEMBLY

CROSS REFERENCE TO RELATED APPLICATION

The present application claims the filing benefits of U.S. provisional application Ser. No. 62/205,912, filed Aug. 17, 2015, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides one or more cameras (preferably one or more CMOS cameras) for a driver assistance system or vision system or imaging system for a vehicle. The cameras are configured to be disposed at a vehicle and are operable to capture image data representative of images exterior of the vehicle. The present invention provides a camera that is assembled without flexible tolerance compensating connectors. The camera is assembled by aligning and focusing the lens relative to the imager and affixing the circuit element (with the imager disposed thereat) relative to the lens holder when the lens is aligned and focused relative to the imager, and then positioning and attaching a header connector at the circuit element (such as a printed circuit board) after the circuit element is affixed relative to the lens holder. The rear camera housing is then mated with the lens holder, wherein mating the rear camera housing with the lens holder comprises electrically connecting electrically conductive pins of the rear camera housing to respective elements of the header connector affixed at the circuit element.

These and other objects, advantages, purposes and features of the present invention will become apparent upon review of the following specification in conjunction with the drawings.

BRIEF DESCRIPTION OF THE DRAWINGS

FIG. 6 is a plan view of the lens holder and circuit board of a camera of the present invention, shown without the connector element;

FIG. 7 is a plan view of the lens holder and circuit board of FIG. 6, shown after the lens is focused and aligned with the imager, and shown with the connector element positioned at the circuit board;

FIG. 9 is a sectional view of a camera of the present invention when assembled together; and FIG. 10 is a table comparing the known camera assembly process to the process of the present invention.

DESCRIPTION OF THE PREFERRED EMBODIMENTS

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
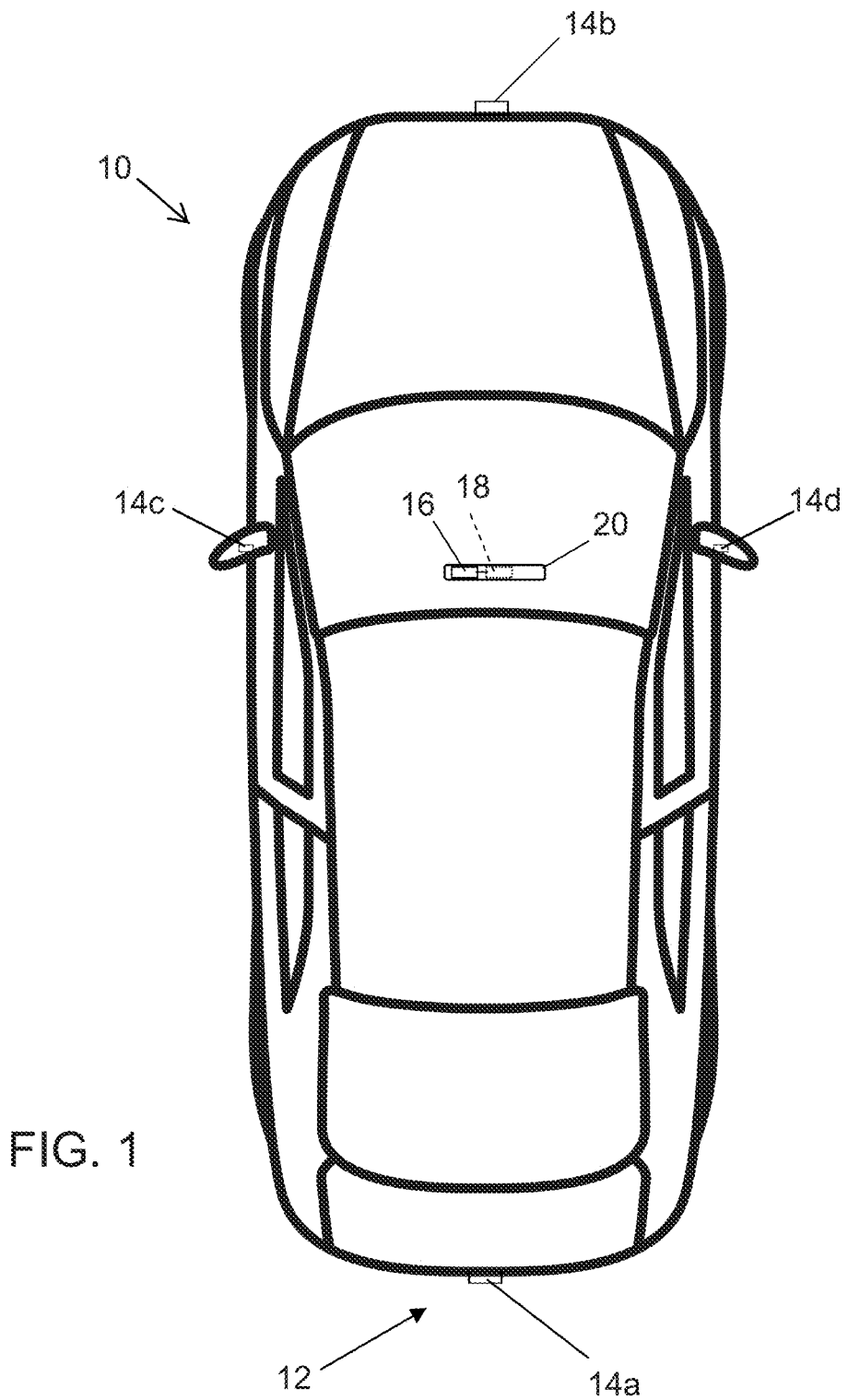
FIG. 1 is a plan view of a vehicle with a vision system that incorporates cameras in accordance with the present invention.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14d at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) or processor 18 that is operable to process image data captured by the camera or cameras and may detect objects or the like and/or provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
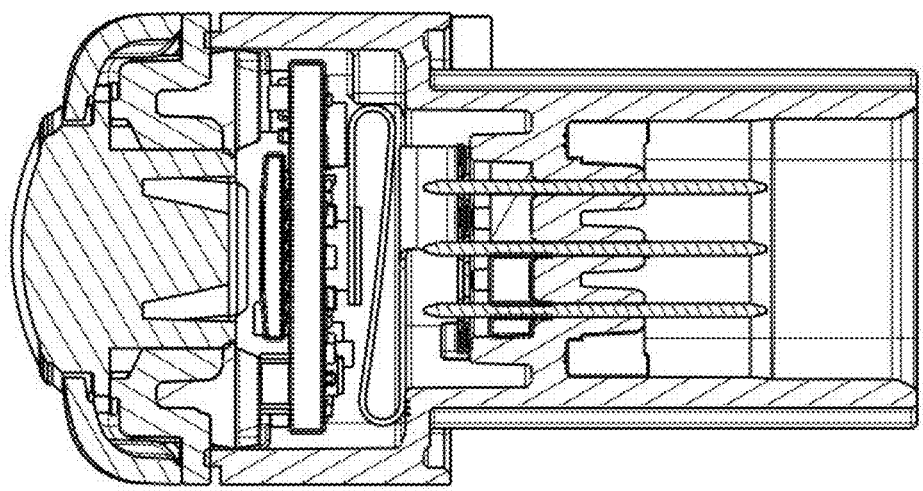
FIG. 2 is a sectional view of a known camera design, shown with a flexible circuit that allows for focus and alignment tolerances of the connector elements or terminals.
Figure 5:
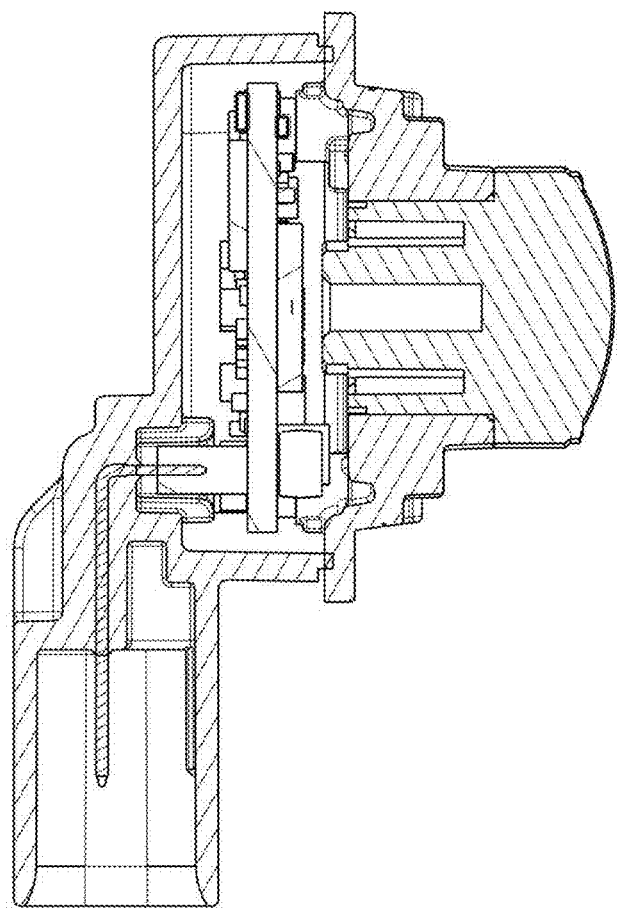
FIG. 5 is a perspective view of another known camera design that utilizes an oversized flange that allows the rear housing to float relative to the lens during assembly of the camera.
Figure 4:
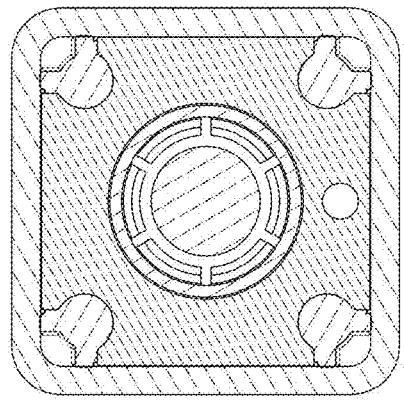
FIG. 4 is a plan view of the lens holder press-fit to the rear housing cover of the camera of FIG. 2.
Figure 3:
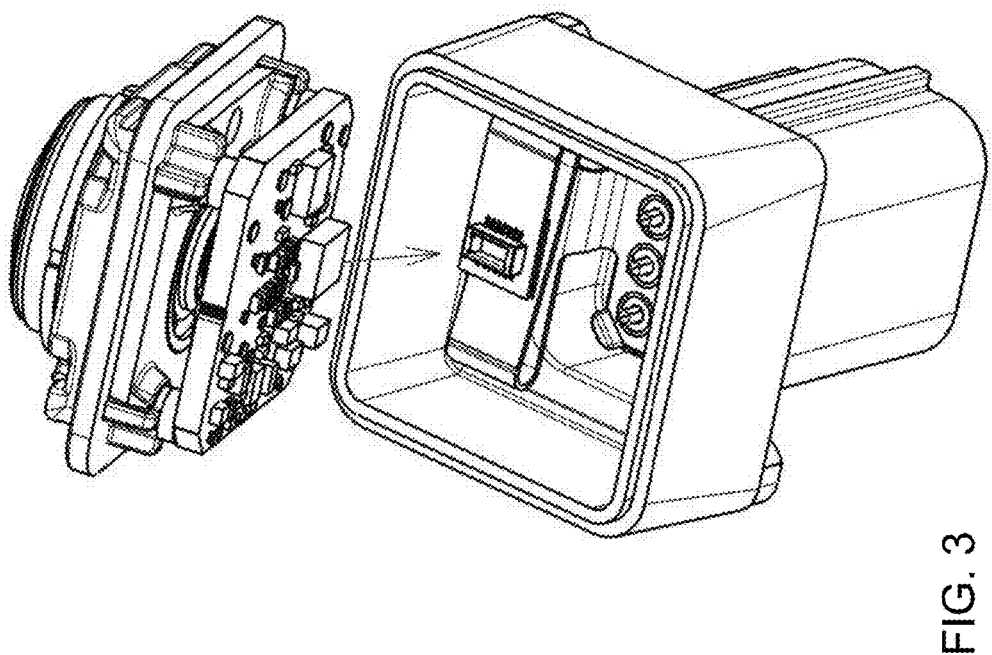
FIG. 3 is an exploded perspective view of the lens holder and rear housing cover of the camera of FIG. 2.
Figure 8:
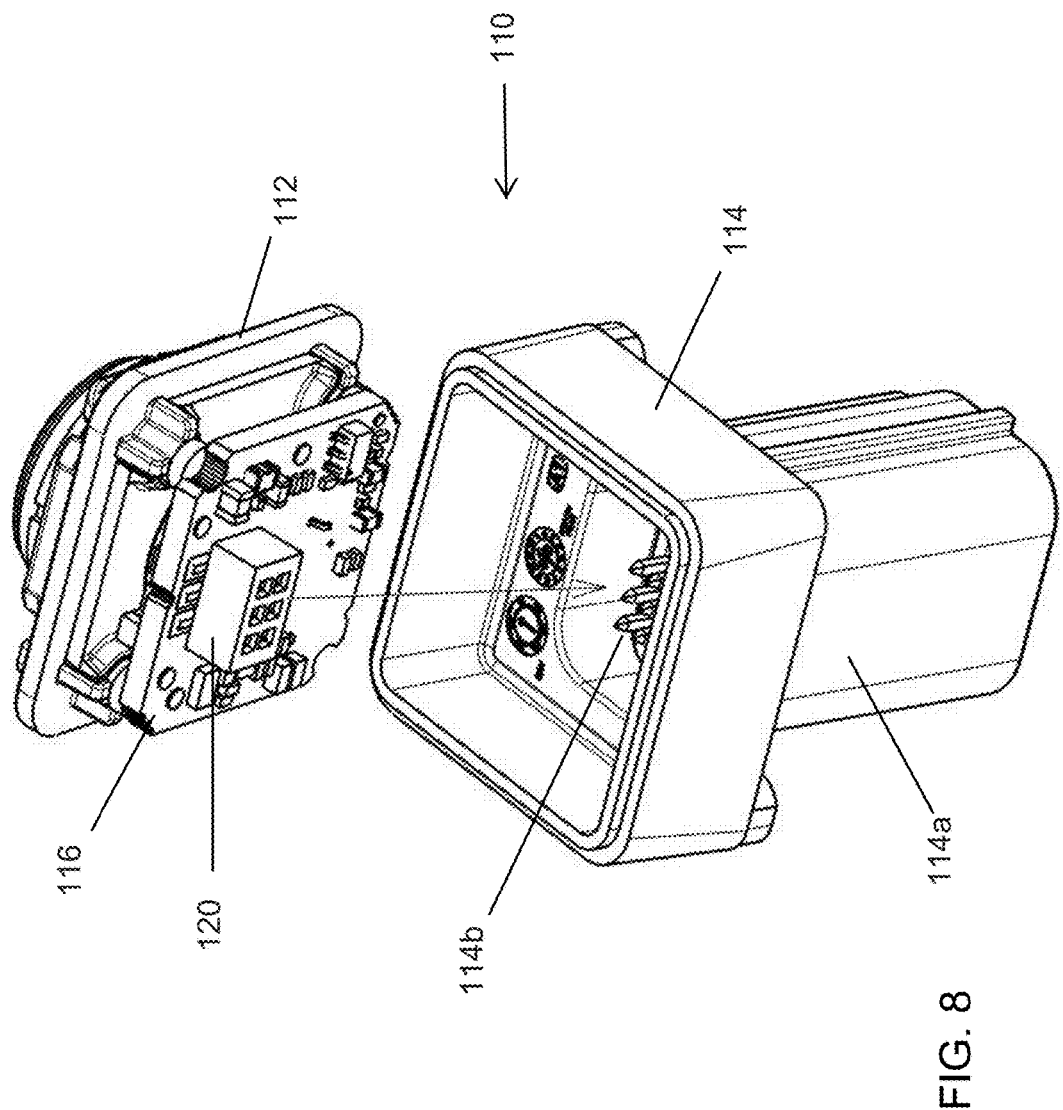
FIG. 8 is an exploded perspective view showing how the housing portions mate together with the connector element configured to engage terminals of the connector of the rear housing portion.

In a camera module, the optical axis of the lens is aligned with the center of the imaging chip on the PCB and fixed rigidly. The electrical connector (that electrically conductively connects to terminals or pins of the connector of the rear housing that electrically conductively connect to a wiring harness or connector of the vehicle) is typically on the opposite surface of the PCB, and engages with the rear camera housing. Because the position of the PCB relative to the housing will vary from camera to camera due to the variations in optical axis tolerances and imager chip placement, the header position will vary such that some compliant member is required between the lens assembly and housing (such as by utilizing tolerance compensating connectors of the types described in U.S. Publication No. US-2013-0328672, which is hereby incorporated herein by reference in its entirety). This compliancy requirement has typically been accommodated via a flexible electrical circuit (such as shown in the known camera of FIGS. 2-4), where the flexible electrical circuit (such as a ribbon cable or the like) electrically connects at one end to a connector element or header at the back of the circuit board (opposite side from the imager) and electrically connects at its other end to the terminals or pins of the electrical connector (such as via soldering at the connector terminals) of the rear housing (the plastic molded connector having a plurality of pins or terminals that electrically connect to a connector end of a wiring harness of the vehicle). In such a configuration, the PCB varies in position from part to part to optimize the imager location relative to the lens, whereby a flexible ribbon connector electrically connects the PCB to the housing connector to compensate for the tolerances (and to absorb or accommodate the focus and alignment tolerances). Optionally, and such as shown in FIG. 5, the compliancy requirement has been accommodated by use of an oversized flange on either the lens holder or housing that allows the housing to float relative to the lens holder and that can absorb the offset by allowing for adjustment of the housing and electrical connectors relative to the circuit board of the lens holder. The electrical connector of the circuit board is electrically connected to the header connector of the flex circuit (see FIG. 3) and, after electrical connection is established (such as by pulling the flexible cable or circuit outward from the housing portion to electrically connect to the PCB at the lens holder), the lens holder may be press-fit to the housing portion (FIG. 4).

The present invention provides an enhanced assembly process and configuration that obviates the compliancy methods of the prior art. The present invention also provides for a reduction in camera size and cost.

As can be seen with reference to FIGS. 6-9, a camera module or assembly 110 of the present invention includes a lens holder 112 (which includes or supports a lens or lens assembly 112a), a camera housing portion or element 114 and a circuit board 116, with an imager 118 disposed thereat. The camera housing portion 114 includes an electrical connector portion 114a, which has a plurality of electrically conductive terminals or pins 114b. As shown in FIGS. 6 and 7, a header connector 120 is electrically connected to circuitry of the circuit board 116, such as at circuitry or solder pads or elements disposed or established at an opposite side of the circuit board from the imager 118.

During assembly of the camera module, the lens may be aligned and focused relative to the imager on the printed circuit board (PCB) before the connector or header is attached (FIG. 6 shows that the PCB is attached at the lens holder, yet does not have the header attached). After the imager and circuit board are fixed relative to the lens (after aligning and focusing the lens relative to the imager), the header connector 120 is applied to the PCB 116 at an appropriate location for aligning with the connector pins of the rear housing connector (see FIG. 7). As can be seen with reference to FIGS. 6 and 7, electrically conductive elements of the header connector (such as terminal ends of the respective electrically conductive elements 120a of the header connector 120) may be electrically connected at circuitry or pads 116a of the PCB 116, whereby the header connector position may be adjusted relative to the PCB and soldered at the appropriate location so as to be affixed to the PCB at the appropriate location. For example, the electrically conductive elements 120a of the header connector 120 may comprise electrically conductive receiving elements or socket elements that are configured to receive ends of the respective electrically conductive elements or pins of the camera housing portion, with each receiving element being electrically conductively connected to the respective element that is soldered or otherwise electrically connected to a respective pad or circuit element of the PCB when the header connector is attached at the PCB. The electrically conductive receiving elements of the header connector (after the imager is aligned with the lens and affixed relative to the lens holder and lens, and after the header connector is then positioned at and affixed at the PCB) receive the ends of the respective electrically conductive elements or pins of the camera housing portion therein as the camera housing element is mated with the lens holder.

The header connector may be positioned at and applied to the PCB using lens holder datums and/or the optical axis of the lens as a position reference (so that the header connector is always disposed at the PCB at a particular location relative to the lens or optical axis). This allows for direct assembly of the lens and lens holder to the rear housing of the camera, without a flexible connector or ribbon cable or the like.

The lens mechanical datums or optical axis thus can be used as reference datums to apply the header connector in a known position such that it can assembled directly to the housing without tolerance compensation (since the location of the pins or terminals of the housing connector are known). The header connector may be affixed and electrically connected to the PCB pads by a soldering method (such as iron tip, heat, induction, laser or the like) while being held by the placement fixturing or robot. Optionally, the header connector may be affixed by an adhesive, and then soldered via SMT. One additional method of affixing the header connector at the circuit board is via a conductive adhesive on each pad. In this case additional non-conductive supporting adhesives may be used under the header connector for additional mechanical strength. This header placement and attachment process may be done as singular cameras or as an array to minimize processing cycle time.

Thus, the PCB and imager may vary in position from part to part to optimize the imager (fixedly disposed at the PCB) location relative to the lens, but the header or connector is placed at or on the PCB after the lens and imager are focused, aligned and fixed relative to one another, so as to place the header connector at the ideal or optimal location relative to the lens holder. The lens holder (with PCB and header) is then aligned with and mated with the housing portion, which receives the PCB and header therein such that the header aligns with and connects to the terminals of the connector of the housing portion (see FIGS. 8 and 9) as the lens holder is mated with the housing portion (such as when mating flanges of the lens holder and housing portion are mated together). The lens holder is press-fit to the housing (or otherwise attached at and sealed at the housing), and the connector pins or terminals 114b are aligned with the electrically conductive elements 120a of the header connector 120 at the PCB 116, such that no compensation ribbon or other tolerance compensating elements are necessary.

The lens and imager alignment of the camera may utilize aspects of the camera assemblies described in U.S. Pat. Nos. 8,542,451 and/or 9,277,104, which are hereby incorporated herein by reference in their entireties. The camera may include electrical connecting elements that may utilize aspects of the cameras and electrical connectors described in U.S. Pat. No. 9,233,641 and/or U.S. Publication Nos. US-2013-0242099; US-2014-0373345; US-2015-0222795; US-2015-0266430; US-2015-0365569 and/or US-2016-0037028, and/or U.S. patent application Ser. No. 15/062,524, filed Mar. 7, 2016, now U.S. Pat. No. 10,128,595, and/or U.S. provisional applications, Ser. No. 62/251,243, filed Nov. 5, 2015, Ser. No. 62/313,278, filed Mar. 25, 2016, Ser. No. 62/319,953, filed Apr. 8, 2016, and/or Ser. No. 62/322,334, filed Apr. 14, 2016, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EyeQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. 2014/0340510; 2014/0313339; 2014/0347486; 2014/0320658; 2014/0336876; 2014/0307095; 2014/0327774; 2014/0327772; 2014/0320636; 2014/0293057; 2014/0309884; 2014/0226012; 2014/0293042; 2014/0218535; 2014/0218535; 2014/0247354; 2014/0247355; 2014/0247352; 2014/0232869; 2014/0211009;2014/0160276; 2014/0168437; 2014/0168415; 2014/0160291; 2014/0152825; 2014/0139676; 2014/0138140; 2014/0104426; 2014/0098229; 2014/0085472; 2014/0067206; 2014/0049646; 2014/0052340; 2014/0025240; 2014/0028852; 2014/005907; 2013/0314503; 2013/0298866; 2013/0222593; 2013/0300869; 2013/0278769; 2013/0258077; 2013/0258077; 2013/0242099; 2013/0215271; 2013/0141578 and/or 2013/0002873, which are all hereby incorporated herein by reference in their entireties. The system may communicate with other communication systems via any suitable means, such as by utilizing aspects of the systems described in International Publication Nos. WO/2010/144900; WO 2013/043661 and/or WO 2013/081985, and/or U.S. Pat. No. 9,126,525, which are hereby incorporated herein by reference in their entireties.

Optionally, the circuit board or chip may include circuitry for the imaging array sensor and or other electronic accessories or features, such as by utilizing compass-on-a-chip or EC driver-on-a-chip technology and aspects such as described in U.S. Pat. Nos. 7,255,451 and/or 7,480,149 and/or U.S. Publication Nos. US-2010-0097469 and/or US-2006-0061008, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for assembling a camera for a vision system of a vehicle, said method comprising:

providing a circuit element having an imager disposed thereat, wherein said imager comprises a pixelated imaging array having a plurality of photosensing elements;

providing a lens holder that includes a lens;

providing a camera housing element, wherein said camera housing element comprises an electrical connector having a plurality of electrically conductive pins;

positioning said circuit element at said lens holder;

after positioning said circuit element at said lens holder, aligning and focusing said lens relative to said imager and affixing said circuit element relative to said lens holder when said lens is aligned and focused relative to said imager;

positioning and attaching a header connector at said circuit element after said circuit element is affixed relative to said lens holder; and mating said camera housing element with said lens holder, wherein mating said camera housing element with said lens holder comprises electrically connecting said electrically conductive pins to respective electrically conductive elements of said header connector.

2. The method of claim 1, wherein said header connector is positioned at said circuit element at a location selected relative to an optical axis of said lens.

3. The method of claim 1, wherein said header connector is positioned at said circuit element at a location selected relative to a datum of said lens holder.

4. The method of claim 1, wherein, when said header connector is positioned and attached at said circuit element, said electrically conductive elements of said header connector are aligned for electrical connection with said electrically conductive pins of said camera housing element when said camera housing element is mated with said lens holder.

5. The method of claim 4, wherein said electrically conductive elements of said header connector comprise electrically conductive receiving elements that receive ends of the respective electrically conductive pins therein as said camera housing element is mated with said lens holder.

6. The method of claim 1, wherein said lens holder is press fit to said camera housing element.

7. The method of claim 1, wherein said imager is disposed at one side of said circuit element, and wherein said header connector is attached at an opposite side of said circuit element.

8. The method of claim 1, wherein said circuit element comprises a printed circuit board.

9. The method of claim 1, wherein electrically connecting said electrically conductive pins to respective electrically conductive elements of said header connector is performed without tolerance compensating flexible connectors.

10. A method for assembling a camera for a vision system of a vehicle, said method comprising:

providing a circuit element having an imager disposed thereat, wherein said imager comprises a pixelated imaging array having a plurality of photosensing elements, and wherein said circuit element comprises a printed circuit board;

providing a lens holder that includes a lens, wherein said lens holder comprises a mating flange about a periphery of said lens holder;

providing a camera housing element, wherein said camera housing element comprises an electrical connector having a plurality of electrically conductive pins, and wherein said camera housing element comprises a mating flange configured for engaging said mating flange of said lens holder;

positioning said circuit element at said lens holder and aligning and focusing said lens relative to said imager;

when said lens is aligned and focused relative to said imager, affixing said circuit element relative to said lens holder;

positioning and attaching a header connector at said circuit element after said circuit element is affixed relative to said lens holder;

wherein said imager is disposed at one side of said circuit element and wherein said header connector is attached at an opposite side of said circuit element; and mating said mating flange of said camera housing element with said mating flange of said lens holder, wherein mating said mating flange of said camera housing element with said mating flange of said lens holder comprises electrically connecting said electrically conductive pins to respective electrically conductive elements of said header connector as said camera housing element is moved towards said lens holder.

11. The method of claim 10, wherein said header connector is positioned at said circuit element at a location selected relative to an optical axis of said lens.

12. The method of claim 10, wherein said header connector is positioned at said circuit element at a location selected relative to a datum of said lens holder.

13. The method of claim 10, wherein, when said header connector is positioned and attached at said circuit element, said electrically conductive elements of said header connector are aligned for electrical connection with said electrically conductive pins of said camera housing element when said mating flange of said camera housing element is mated with said mating flange of said lens holder.

14. The method of claim 13, wherein said electrically conductive elements of said header connector comprise electrically conductive receiving elements that receive ends of the respective electrically conductive pins therein as said mating flange of said camera housing element is mated with said mating flange of said lens holder.

15. The method of claim 10, wherein said mating flange of said lens holder is press fit to said mating flange of said camera housing element.

16. The method of claim 10, wherein electrically connecting said electrically conductive pins to respective electrically conductive elements of said header connector is performed without tolerance compensating flexible connectors.

17. A method for assembling a camera for a vision system of a vehicle, said method comprising:

providing a circuit element having an imager disposed thereat, wherein said imager comprises a pixelated imaging array having a plurality of photosensing elements;

providing a lens holder that includes a lens;

providing a camera housing element, wherein said camera housing element comprises an electrical connector having a plurality of electrically conductive pins;

positioning said circuit element at said lens holder;

after positioning said circuit element at said lens holder, aligning and focusing said lens relative to said imager;

affixing said circuit element relative to said lens holder when said lens is aligned and focused relative to said imager;

positioning and attaching a header connector at said circuit element after said circuit element is affixed relative to said lens holder;

wherein said imager is disposed at one side of said circuit element, and wherein said header connector is attached at an opposite side of said circuit element;

wherein, when said header connector is positioned and attached at said circuit element, electrically conductive elements of said header connector are aligned for electrical connection with said electrically conductive pins of said camera housing element when said camera housing element is mated with said lens holder;

mating said camera housing element with said lens holder, wherein mating said camera housing element with said lens holder comprises electrically connecting said electrically conductive pins to respective electrically conductive elements of said header connector; and wherein said electrically conductive elements of said header connector comprise electrically conductive receiving elements that receive ends of the respective electrically conductive pins therein as said camera housing element is mated with said lens holder.

18. The method of claim 17, wherein said header connector is positioned at said circuit element at a location selected relative to an optical axis of said lens.

19. The method of claim 17, wherein said header connector is positioned at said circuit element at a location selected relative to a datum of said lens holder.

20. The method of claim 17, wherein said lens holder is press fit to said camera housing element.

* * * * *